United States Patent
Li et al.

(10) Patent No.: US 12,272,838 B2
(45) Date of Patent: Apr. 8, 2025

(54) SEPARATOR, PROCESS FOR PREPARING THE SAME, LITHIUM ION SECONDARY BATTERY, BATTERY MODULE, BATTERY PACK AND APPARATUS

(71) Applicant: CONTEMPORARY AMPEREX TECHNOLOGY (HONG KONG) LIMITED, Hong Kong (CN)

(72) Inventors: Wei Li, Ningde (CN); Chao Jin, Ningde (CN); Haihao Shi, Ningde (CN); Qian Li, Ningde (CN)

(73) Assignee: Contemporary Amperex Technology (Hong Kong) Limited, Hong Kong (CN)

( * ) Notice: Subject to any disclaimer, the term of this patent is extended or adjusted under 35 U.S.C. 154(b) by 610 days.

(21) Appl. No.: 17/565,499

(22) Filed: Dec. 30, 2021

(65) Prior Publication Data

US 2022/0123436 A1 Apr. 21, 2022

Related U.S. Application Data

(63) Continuation of application No. PCT/CN2020/113801, filed on Sep. 7, 2020.

(30) Foreign Application Priority Data

Sep. 17, 2019 (CN) .......................... 201910874822.5

(51) Int. Cl.
*H01M 50/449* (2021.01)
*H01M 10/0525* (2010.01)
*H01M 50/403* (2021.01)
*H01M 50/417* (2021.01)
*H01M 50/454* (2021.01)

(52) U.S. Cl.
CPC ..... *H01M 50/454* (2021.01); *H01M 10/0525* (2013.01); *H01M 50/403* (2021.01); *H01M 50/417* (2021.01); *H01M 2220/20* (2013.01)

(58) Field of Classification Search
None
See application file for complete search history.

(56) References Cited

U.S. PATENT DOCUMENTS

2013/0017431 A1* 1/2013 Frisk ................. H01M 10/0525
427/58
2013/0323569 A1* 12/2013 Yeou ................... H01M 10/052
429/144

FOREIGN PATENT DOCUMENTS

| CN | 103956448 A | 7/2014 |
|---|---|---|
| CN | 105742551 A | 7/2016 |
| CN | 108346765 A | 7/2018 |
| CN | 207818723 U | 9/2018 |
| CN | 108987654 A | 12/2018 |
| CN | 109004165 A | 12/2018 |
| CN | 109037555 A | 12/2018 |
| CN | 110137414 A | 8/2019 |
| CN | 111063852 A | 4/2020 |
| CN | 210576168 U | 5/2020 |
| JP | 2003022793 A | 1/2003 |

OTHER PUBLICATIONS

Lewchalermwong et al, Material selection and assembly method of battery pack for compact electric vehicle, IOP Conference Series Materials Science and Engineering 297(1):012019 (Year: 2018).*
The extended European search report for European Application No. 20865882.3, dated Oct. 20, 2022, 9 pages.
Brdicka R et al.,Surface area and pore size determination Modern Methods in Heterogeneous Catalysis Research, Nov. 1, 2013, 52 pages.
Anonymous, Specific surface area Wikipedia, Apr. 23, 2021, 3 pages.
The First Office Action for CN Application No. 201910874822.5, dated Apr. 2, 2024, 10 pages.
The International search report for PCT Application No. PCT/CN2020/113801, dated Nov. 30, 2020, 12 pages.

* cited by examiner

*Primary Examiner* — Yoshitoshi Takeuchi
(74) *Attorney, Agent, or Firm* — East IP P.C.

(57) ABSTRACT

The present embodiments provide a separator, a process for preparing the same, a lithium ion secondary battery, a battery module, a battery pack and an apparatus. The separator provided by the present application comprises a porous base film and a functional coating disposed on at least one surface of the porous base film, wherein the functional coating comprises polyimide nanosheets, and the polyimide nanosheets are stacked irregularly to form a lamellar loose structure; and a thickness ratio of the functional coating to the porous base film is from 0.1 to 1.0. The present application also provides a process for preparing the separator, and a lithium ion secondary battery and an apparatus comprising the separator.

12 Claims, No Drawings

SEPARATOR, PROCESS FOR PREPARING THE SAME, LITHIUM ION SECONDARY BATTERY, BATTERY MODULE, BATTERY PACK AND APPARATUS

CROSS-REFERENCE TO RELATED APPLICATION

This application is a continuation of International Application No. PCT/CN2020/113801, filed on Sep. 7, 2020, which claims priority to Chinese Patent Application No. 201910874822.5 filed on Sep. 17, 2019, both of which are incorporated herein by reference in their entireties.

TECHNICAL FIELD

This application relates to the field of batteries, and in particular to a separator, a process for preparing the same, a lithium ion secondary battery, and an apparatus.

BACKGROUND

In a lithium ion battery structure, a separator is one of the key internal components, which has an important impact on the overall performance of the lithium ion battery. Lithium ion batteries with excellent performances require that the separators they use not only have the basic performance of ordinary separators, but also have excellent high temperature resistance. The conventional PE separator used in the existing lithium ion battery has a melting point of 130° C., and when the temperature reaches 150° C., the separator will shrink by more than 30%, which may cause a short circuit of cathode and anode inside the lithium ion battery, thereby producing a big potential safety hazard to the battery.

At present, the main means to solve the problem of high temperature resistance of the separator is to use CCS (Ceramic Coating Separation, abbreviated as CCS). For example, a conventional separator is coated with boehmite slurry, or a heat resistant material is used to fabricate a separator. However, there is a problem of agglomeration in the production process of CCS, which makes the CCS-coated separator to have particles therein, so that these particles are easy to pierce the separator during hot pressing, and the specific gravity of boehmite is relatively large, which will reduce the weight energy density of the lithium ion battery. In addition, other separator materials with good heat resistance and reasonable cost that have been developed have not been found.

SUMMARY

In view of the problems in the background art, the object of the present application is to provide a separator, a process for preparing the same, a lithium ion secondary battery, and an apparatus, so as to improve the high temperature resistance of separators and the thermal safety and stability of batteries and apparatus.

In order to achieve the above object, the present application in a first aspect provides a separator, including a porous base film and a functional coating disposed on at least one surface of the porous base film, wherein the functional coating includes polyimide nanosheets, and the polyimide nanosheets are stacked irregularly to form a lamellar loose structure; and wherein a thickness ratio of the functional coating to the porous base film is from 0.1 to 1.0.

First of all, the separator provided by the present application contains polyimide in the surface coating of the separator. Because polyimide has better high temperature resistance, chemical resistance and electronic insulation, the thermal and chemical stability of the separator may be greatly improved. On one hand, the long-term service temperature of the separator may be increased to 300° C., and it will not cause the failure of a battery cell if it is kept in an environment of 150° C. for 2 h; the thermal shrinkage resistance of the separator has also been significantly improved, so the pore structure of the separator may keep unchanged in an environment above 180° C. On the other hand, the polyimide does not swell or dissolve in an electrolytic solution, and will not have any chemical reaction with the electrolytic solution and positive and negative materials, which may ensure the stable operation of the battery during long-term service. On the other hand, the polyimide coating may isolate the internal conduction of electrons between positive and negative electrodes, and prevent the positive and negative electrodes of battery from being short-circuited, thereby reducing the self-discharge rate of the lithium ion battery and effectively improving the safety of the battery.

In some exemplary embodiments, the polyimide used in the functional coating of the separator of the present application is a nanosheet material, and the polyimide nanosheets are stacked irregularly to form a laminar loose structure. Compared with polyimide polymer materials or polyimide nanofibers, the polyimide nanosheets and the laminar loose structure formed by their stacking have significantly increased physical area and higher toughness, so that the functional coating in the present application has the characteristics of greater coverage area per unit weight, smaller effective coating thickness and lighter weight. On one hand, the laminar structure has a greater contact area with the bare film so that the thermal shrinkage resistance is better; and it may more effectively resist the mechanical puncture of lithium dendrites, thus avoiding micro-short circuits, and improving the safety and cycle performance of the battery. On the other hand, it may more completely isolate the internal conduction of electrons between the positive and negative electrodes, effectively increase tortuosity of micropores of the separator, and greatly reduce self-discharge rate of the lithium battery. Further, it may more effectively reduce the weight of the battery and shrink the volume of the battery, thus indirectly increasing the gram capacity, volume capacity and energy density of the battery.

More importantly, it is found by the applicant that a thickness ratio of the functional coating to the porous base film has a critical effect on the final performance of the separator. As the thickness ratio of the functional coating to the porous base film increases, the thermal shrinkage performance of the separator is improved, the thermal stability of the battery core is improved, the puncture resistance of the separator is improved, and the safety of the battery cell is improved; meanwhile, the gas permeability of the separator decreases, and an ion transport channel becomes smaller. When the thickness ratio of the functional coating to the porous base film in the present application is within the range of 0.1 to 1.0, under the comprehensive influence of the thermal shrinkage and the gas permeability of the separator, the thermal stability and safety of the battery cell, and other properties, a lithium ion secondary battery and an apparatus including the separator of the present application may obtain the best performance.

In some exemplary embodiments, the thickness of the porous base film is from 2 µm to 16 µm, and the thickness of the functional coating is from 1 µm to 10 µm. Under the premise that the thickness ratio of the functional coating to the porous base film is within the range of 0.1 to 1.0, the thicknesses of the porous base film and the functional coating may be adjusted within a reasonable range.

In some exemplary embodiments, the average monolithic area of the polyimide nanosheets is from 3 $\mu m^2$ to 12 $\mu m^2$. The average monolithic area of the polyimide nanosheets affects the thermal shrinkage resistance, the puncture resistance and the gas permeability of the separator. As the average monolithic area of the nanosheets increases, the hot box shrinkage rate of the separator is reduced accordingly, and the thermal shrinkage resistance is improved; meanwhile, the puncture resistance is enhanced; but the gas permeability is reduced, thereby affecting the wettability of the electrolyte.

In some exemplary embodiments, the polyimide nanosheet has a length of 5 $\mu m$ to 10 $\mu m$ and a width of 1 $\mu m$ to 5 $\mu m$. Compared with polyimide nanofibers or polyimide nanofiber wires, the polyimide nanosheets having lengths and widths within the above ranges have the characteristics of greater coverage area per unit weight, smaller effective coating thickness and lighter weight.

In some exemplary embodiments, the thickness of the polyimide nanosheet is from 100 nm to 300 nm. The thickness of the polyimide nanosheet also affects the thermal shrinkage resistance, the puncture resistance and the gas permeability of the separator. As the thickness of the nanosheet increases, the hot box shrinkage rate of the separator is reduced accordingly, the puncture resistance is also improved, but the gas permeability decreases, thereby affecting the wettability of the electrolyte to the separator.

In some exemplary embodiments, the functional coating further includes a binder; and the binder includes one or more of polyfluoroolefin binders, polyacrylate binders, polyacrylic acid binders, polyurethane binders, silicon resin binders, epoxy binders and cellulose-derived binders. Using the above-mentioned binders may improve adhesion of the functional coating.

In some exemplary embodiments, the mass percentage of the binder in the functional coating is from 5% to 40%; and the mass percentage of the polyimide nanosheets in the functional coating is from 60% to 95%. The content of the binder in the functional coating also affects the thermal shrinkage resistance, the gas permeability and the puncture resistance of the separator. As the content of the binder increases, the hot box shrinkage rate of the separator is reduced accordingly, the puncture resistance is also improved, but the gas permeability decreases, thereby affecting the wettability of the electrolyte to the separator.

In some exemplary embodiments, the porous base film is selected from polyolefin base films, and preferably from one of polypropylene film, polyethylene film and polyethylene-propylene copolymer film. The porous base film has better physical stability, mechanical strength and air tightness, and higher transparency and gloss, and is tough and wear-resistant.

The present application in a second aspect provides a process for preparing the separator in the first aspect of the present application, including: (1) mixing polyimide nanosheets, a binder and deionized water together to obtain an aqueous dispersion of polyimide nanosheet; and (2) applying the aqueous dispersion of polyimide nanosheet on at least one surface of a porous base film to form a functional coating, wherein a thickness ratio of the functional coating to the porous base film is from 0.1 to 1.0, and drying to obtain the separator.

The present application in a third aspect provides a lithium ion secondary battery, including a positive electrode plate, a negative electrode plate, a separator disposed between the positive electrode plate and the negative electrode plate, and an electrolytic solution, wherein the separator is the separator in the first aspect of the present application.

The present application in a fourth aspect provides a battery module, including the above-mentioned lithium ion secondary battery, the lithium ion secondary battery including a positive electrode plate, a negative electrode plate, a separator disposed between the positive electrode plate and the negative electrode plate, and an electrolyte, wherein the separator is the separator in the first aspect of the present application.

The present application in a fifth aspect provides a battery pack, including the above-mentioned battery module.

The present application in a sixth aspect provides an apparatus, including the lithium ion secondary battery in the third aspect of the present application.

The battery module, the battery pack and the apparatus provided by the present application include the lithium ion secondary battery of the present application, and therefore have at least the same or similar beneficial effects.

DETAILED DESCRIPTION

Implementations of the present application will be further described in detail below in conjunction with the accompanying drawings and embodiments. The detailed description of the following embodiments and the drawings are used to exemplarily illustrate the principle of the present application, but cannot be used to limit the scope of the present application, namely, the present application is not limited to the described embodiments.

In the description of the present application, it should be noted that, unless otherwise specified, "plurality of" means two or more; the orientations or positional relationships indicated by the terms "upper", "lower", "left", "right", "inner", "outer", etc. are only for facilitating description of the present application and simplifying the description, but do not indicate or imply that the mentioned apparatuses or elements must have specific orientations or be constructed and operated in specific orientations. Therefore, the terms should not be understood to limit the present application. In addition, the terms "first", "second", "third", etc. are for descriptive purposes only and should not be construed as indicating or implying relative importance. "Vertical" is not strictly vertical, but within an allowable range of error. "Parallel" is not strictly parallel, but within an allowable range of error.

The orientation terms appearing in the following description all indicate directions shown in the drawings, and are not intended to limit specific structures of the present application. In the description of the present application, it should be noted that, unless otherwise specified and defined, the terms "mounted", "coupled", and "connected" should be generally understood, for example, the "connected" may be fixedly connected, detachably connected, integrally connected, directly coupled, or indirectly coupled by a medium. Those skilled in the art may understand the specific meanings of the above terms in the present application according to specific circumstances.

According to the first aspect of embodiments of the present applications, the embodiments of the present application provide a separator, the separator including a porous base film and a functional coating disposed on at least one surface of the porous base film, wherein the functional coating includes polyimide nanosheets, and the polyimide nanosheets are stacked irregularly to form a lamellar loose structure; and wherein a thickness ratio of the functional coating to the porous base film is from 0.1 to 1.0.

Because polyimide has better high temperature resistance, chemical resistance and electronic insulation, the thermal and chemical stability of the separator may be greatly improved. On one hand, the long-term service temperature of the separator may be increased to 300° C., and it will not cause the failure of a battery cell if it is kept in an environment of 150° C. for 2 h; and the thermal shrinkage resistance of the separator has also been significantly improved, so the pore structure of the separator may be kept unchanged in an environment above 180° C. On the other hand, the polyimide does not swell or dissolve in an electrolytic solution, and will not have any chemical reaction with the electrolytic solution and positive and negative materials, which may ensure the stable operation of the battery during long-term service. Moreover, the polyimide coating may isolate the internal conduction of electrons between the positive and negative electrodes, and prevent the positive and negative electrodes of the battery from being short-circuited, thereby reducing the self-discharge rate of the lithium ion battery and effectively improving the safety of the battery.

In some embodiments, the polyimide used in the functional coating of the separator provided by the embodiments of the present application is a nanosheet material, and the polyimide nanosheets are stacked irregularly to form a laminar loose structure. Compared with polyimide polymer materials or polyimide nanofibers, the polyimide nanosheets and the laminar loose structure formed by their stacking have significantly increased physical area and higher toughness, so that the functional coating in the present application has the characteristics of greater coverage area per unit weight, smaller effective coating thickness and lighter weight. On one hand, the laminar structure has a greater contact area with the bare film so that the thermal shrinkage resistance is better; and it may more effectively resist the mechanical puncture of lithium dendrites, thus avoiding micro-short circuits, and improving the safety and cycle performance of the battery. On the other hand, it may more completely isolate internal conduction of electrons between the positive and negative electrodes, effectively increase tortuosity of micropores of the separator, and greatly reduce self-discharge rate of the lithium battery. Further, it may more effectively reduce the weight of the battery and shrink the volume of the battery, thus indirectly increasing the gram capacity, volume capacity and energy density of the battery.

Moreover, it has been verified through experiments that a thickness ratio of the functional coating to the porous base film has a critical effect on the final performance of the separator. As the thickness ratio of the functional coating to the porous base film increases, the thermal shrinkage performance of the separator is improved, the thermal stability of the battery core is improved, the puncture resistance of the separator is improved, and the safety of the battery cell is improved; meanwhile, the gas permeability of the separator decreases, and an ion transport channel becomes smaller. When the thickness ratio of the functional coating to the porous base film is within the range of 0.1 to 1.0, under the comprehensive influence of the thermal shrinkage and the gas permeability of the separator, the thermal stability and safety of the battery cell, and other properties, a lithium ion secondary battery and an apparatus including the separator of the present application may obtain the best performance.

In some embodiments, the thickness of the porous base film is from 2 μm to 16 μm, and the thickness of the functional coating is from 1 μm to 10 μm. Under the premise that the thickness ratio of the functional coating to the porous base film is within the range of 0.1 to 1.0, the thicknesses of the porous base film and the functional coating may be adjusted within a reasonable range. Considering the basic performance of the separator, the conventional porous base film in the field has a thickness of 2 μm to 16 μm. Under this premise, the thickness of the functional coating in the embodiments of the present application is preferably within the range of 1 μm to 10 μm.

In some embodiments, the average monolithic area of the polyimide nanosheets is 3 square micrometer ($μm^2$) to 12 $μm^2$. The average monolithic area of the polyimide nanosheets affects the thermal shrinkage resistance, the puncture resistance and the gas permeability of the separator. As the average monolithic area of the nanosheets increases, the hot box shrinkage rate of the separator is reduced accordingly, and the thermal shrinkage resistance is improved; meanwhile, the puncture resistance is enhanced; but the gas permeability is reduced, thereby affecting the wettability of the electrolyte to the separator. Therefore, the average monolithic area of the polyimide nanosheets in the present application is within a preferred range of 3 $μm^2$ to 12 $μm^2$. As an example, the average monolithic area of the polyimide nanosheets may be from 4 $μm^2$ to 12 $μm^2$.

In some embodiments, the polyimide nanosheet has a length of 5 μm to 10 μm and a width of 1 μm to 5 μm. Compared with polyimide nanofibers or polyimide nanofiber wires, the polyimide nanosheets having lengths and widths within the above ranges have the characteristics of greater coverage area per unit weight, smaller effective coating thickness and lighter weight. On one hand, the laminar structure has a greater contact area the contact area with the bare film so that the thermal shrinkage resistance is better; and it may more effectively resist the mechanical puncture of lithium dendrites, thus avoiding micro-short circuits, and improving the safety and cycle performance of the battery. On the other hand, the laminar structure may more completely isolate the internal conduction of electrons between the positive and negative electrodes, effectively increase tortuosity of micropores of the separator, and greatly reduce self-discharge rate of the lithium battery. At the same time, it may more effectively reduce the weight of the battery and shrink the volume of the battery, thus indirectly increasing the gram capacity, volume capacity and energy density of the battery.

In some embodiments, the thickness of the polyimide nanosheet is from 100 nanometers (nm) to 300 nm. The thickness of the polyimide nanosheet also affects the thermal shrinkage resistance, the puncture resistance and the gas permeability of the separator. As the thickness of the nanosheet increases, the hot box shrinkage rate of the separator is reduced accordingly, the puncture resistance is also improved, but the gas permeability decreases, thereby affecting the wettability of the electrolyte to the separator. Therefore, the thickness of the polyimide nanosheet in the present application is within a preferred range of 100 nm to 300 nm.

In some embodiments, the functional coating further includes a binder; and the binder includes one or more of polyfluoroolefin binders, polyacrylate binders, polyacrylic acid binders, polyurethane binders, silicon resin binders, epoxy binders and cellulose-derived binders.

In some embodiments, the mass percentage of the binder in the functional coating is from 5% to 40%; and the mass percentage of the polyimide nanosheets in the functional coating is from 60% to 95%. The content of the binder in the functional coating also affects the thermal shrinkage resistance, the gas permeability and the puncture resistance of the separator. As the content of the binder increases, the hot box shrinkage rate of the separator is reduced accordingly, the puncture resistance is also improved, but the gas permeability decreases, thereby affecting the wettability of the electrolyte to the separator. Therefore, in the embodiments of the present application, the mass percentage of the binder in the functional coating is within a preferred range of 5% to 40%.

In some embodiments, the porous base film is selected from polyolefin base films, and as an example, it may be one selected from polypropylene film, polyethylene film and polyethylene-propylene copolymer film.

According to the second aspect of the embodiments of the present application, the embodiments of the present application provide a process for preparing the above-mentioned separator, including: (1) mixing polyimide nanosheets, a binder and deionized water together to obtain an aqueous dispersion of polyimide nanosheet, wherein the mass percentage of the polyimide nanosheets and the binder each is 6% to 50%, and the balance is deionized water; and (2) applying the aqueous dispersion of polyimide nanosheet on at least one surface of the porous base film to form a functional coating, wherein the thickness ratio of the functional coating to the porous base film is from 0.1 to 1.0, and drying to obtain the separator.

In the above-mentioned process provided by the embodiments of the present application, by adjusting the formulation of the aqueous dispersion of polyimide nanosheet, the formed dispersion has very good stability, which stable slurry is applied on a bare film via a coating technology and is dried to obtain the functional coating that is naturally stacked to form a laminar loose structure.

According to the third aspect of the embodiments of the present application, the embodiments of the present application further provide a lithium-ion secondary battery, including a positive electrode plate, a negative electrode plate, a separator disposed between the positive electrode plate and the negative electrode plate, and an electrolytic solution, wherein the separator is the separator provided in the first aspect of the embodiments of the present application.

The fourth aspect of the present application provides a battery module, including the above-mentioned lithium ion secondary battery, the lithium ion secondary battery including a positive electrode plate, a negative electrode plate, a separator disposed between the positive electrode plate and the negative electrode plate, and an electrolytic solution, wherein the separator is the separator in the first aspect of the present application.

The fifth aspect of the present application provides a battery pack, including the above-mentioned battery module.

According to the sixth aspect of the embodiments of the present application, the embodiments of the present application further provide an apparatus, including the lithium ion secondary battery in the third aspect of the present application.

The embodiments of the present application further provides a battery module including the lithium ion secondary battery as a unit cell and a battery pack including the battery module.

The battery pack may be used as a power supply for medium or large apparatuses that require high temperature stability, long cycle life and high rate characteristics.

Examples of these medium or large apparatuses include, but are not limited to: electric tools driven by electric motors; electric vehicles (referred to as EVs), hybrid electric vehicles (referred to as HEVs), and plug in hybrid electric vehicles (referred to as PHEVs); electric two-wheeled vehicles such as electric bicycles and electric scooters; electric golf vehicles; and systems for storing electricity.

Hereinafter, in combination with some exemplary examples and comparative examples, the separator, the process for preparing the same, the lithium ion secondary battery and the apparatus provided in the embodiments of the present application are further described. It should be understood that these embodiments are only used to illustrate the present application, rather than limiting the scope of the present application.

Examples 1-23

(1) Preparation of a Separator

Polyimide nanosheets, a binder and deionized water were mixed together to obtain an aqueous dispersion of polyimide nanosheet, wherein the total mass percentage of the polyimide nanosheets and the binder in the aqueous dispersion of polyimide nanosheet was 6% to 50%, and the ratio of the polyimide nanosheets to the binder in parts by weight was 5-40: 60-95.

The aqueous dispersion of polyimide nanosheet was applied on both surfaces of a polyolefin base film by a coating equipment commonly used in the art to form a functional coating, in which the thickness ratio of the functional coating to the porous film was from 0.1 to 1.0, and dried at 60° C. to 80° C. to obtain the separator.

(2) Preparation of a Positive Electrode Plate

Lithium cobalt oxide as a positive electrode active material, conductive carbon as a conductive agent, and poly (vinylidene fluoride) (referred to as PVDF) as a binder were mixed uniformly at a mass ratio of 96:2:2 to make a positive electrode slurry of lithium ion battery with a certain viscosity. The positive electrode slurry was applied on an aluminum foil as a positive electrode current collector, dried at 85° C. and then cold pressed. After trimming, slicing and slitting, drying was carried out under vacuum conditions at 85° C. for 4 h, and a tab was welded to fabricate the positive electrode plate.

(3) Preparation of a Negative Electrode Plate

A mixture of graphite and silicon (Si) powder (wherein the mass percentage of Si powder is 50%) as a negative electrode active material, butadiene styrene rubber as a negative electrode binder, and conductive carbon black (Super P) as a negative electrode conductive agent at a mass ratio of 92:3:5 were mixed and dispersed into N-methylpyrrolidone (referred to as NMP) as a solvent to make a negative electrode slurry, and the negative electrode slurry was evenly applied on the front and back surfaces of a copper foil as a negative electrode current collector in a coating amount of 130 mg/1540 mm$^2$, and was dried in an oven at 85° C. to obtain the negative electrode plate.

(4) Preparation of an Electrolytic Solution

Lithium hexafluorophosphate was dissolved in a mixed solvent of ethylene carbonate, dimethyl carbonate and ethyl methyl carbonate to obtain the electrolyte, wherein the volume ratio of ethylene carbonate, dimethyl carbonate and ethyl methyl carbonate was 1:2:1.

(5) Preparation of a Lithium Ion Secondary Battery

The above-mentioned positive electrode plate, the negative electrode plate and the separator disposed between the positive electrode plate and the negative electrode plate were wound and assembled; and the electrolyte was injected to fabricate the lithium ion secondary battery.

The separators and the lithium ion secondary batteries of Examples 1 to 23 of the present application were prepared according to the above methods, and the detailed parameters of the separators and the lithium ion secondary batteries prepared in each example are shown in Table 1.

In addition, the present application further provides separators and lithium ion secondary batteries prepared in Comparative Examples 1 to 8, whose technical effect are compared with the technical effects of the separators and the lithium ion secondary batteries prepared in Examples 1 to 23.

Among them, the separator provided in Comparative Example 1 had no functional coating; the separator provided in Comparative Example 2 had a functional coating, but the functional coating contained polyimide polymers and a binder; and the separator provided in Comparative Example 3 also had a functional coating, but the functional coating contained polyimide nanofibers and a binder. The separators provided in Comparative Examples 4 to 8 had functional coatings, and the functional coatings contained polyimide nanosheets and binders, but the thickness ratio of the functional coating to the porous base film was not within the range of 0.1 to 1.0. The detailed parameters of Comparative Examples 1-8 are also shown in Table 1.

The definitions and measurement methods of performance parameters of the separators and the lithium ion secondary batteries in Examples 1 to 23 and Comparative Examples 1 to 8 are as follows:

(1) Test of a Thermal Shrinkage Rate of Separators:

A thermal shrinkage rate S of separators refers to a length shrinkage ratio in a TD direction (Transverse Direction, perpendicular to a machine direction, abbreviated as a TD direction): $S=(L1-L2)/L1$.

S: shrinkage rate; L1: length in the TD direction before shrinkage; L2: length in the TD direction after shrinkage.

In the examples of the present application, in a high-temperature oven with a product code name of DHG-9070A DHG, the thermal shrinkage rate of the separators were tested with the VW (Volks Wagenwerk, Volkswagen, abbreviated as VW) hot box test standard by heating the separators to 80° C. at a heating rate of 2° C./min, and maintaining the temperature for 16 h; further heating the separators to 120° C. at the same rate of 2° C./min, and maintaining the temperature for 2 h; and still further heating the separators to 150° C. at the same rate of 2° C./min, and maintaining the temperature for 2 h.

(2) Test of a Gas Permeability of the Separator:

A gas permeability of separators refers to the degree to which an object or medium allows gas to pass, which was measured by the time required for a certain volume of gas such as from 25 cubic centimeter (abbreviated as cc) to 300 cc to flow through a sample with a specific area, under a stable pressure.

In the examples of the present application, an gas permeability tester with a product code name of Gurley 4110N produced in the United States was used to test the gas permeability of the separator. The test method comprises measuring the time required for 100 cc of air to pass through a separator with a circular area of 3 inches in diameter under a high pressure of 4.88 inches of water column, in seconds (s).

(3) Test of a Puncture Resistance Strength:

A puncture resistance strength of separators was expressed by a maximum force value, that is, a puncture force, generated in the process of piercing a sample to be tested.

In the examples of the present application, an electronic universal testing machine with a product code name of Sansi Zongheng UTM6104 was used to test the puncture resistance strength of the separator. The test method comprises cutting 5 pieces of sample separators, setting the test speed as 100 mm/min, sample name, test times and other parameter information on equipment control software, clicking a test operation to obtain a puncture force value of the sample, and taking an average value as the result.

(4) Test of a Battery Cycle Performance:

A lithium ion charging and discharging equipment, a special tester with a product code name of Xinwei mobile power finished product was used to charge and discharge the battery repeatedly, until the capacity attenuation rate reached 80%. As described above, for a battery cell with a capacity of 70 ampere hours (Ah), the battery cell was subjected to charging and discharging repeatedly, and the test stopped when the capacity of the battery cell decayed to 56 Ah. The number of repeated charging and discharging cycle was recorded, which was the cycle performance data of the battery cell.

Table 1 below shows the detailed parameters and test results of the separators and the lithium ion secondary batteries provided in Examples 1 to 23 and Comparative Examples 1 to 8.

TABLE 1

Detailed parameters and test results of Examples and Comparative Examples

| | PE base film Thickness (μm) | Functional coating Thickness (μm) | Thickness ratio of the functional coating to the base film | Polyimide nanosheet Average monolithic area (μm²) | Thickness (nm) | Mass percentage of the binder in the functional coating | Hot box shrinkage rate | Gas permeability | Puncture resistance strength | Cycle performance |
|---|---|---|---|---|---|---|---|---|---|---|
| Example 1 | 10 | 1 | 0.1 | 8 | 120 | 20% | 30% | 200 | 0.57 | 1858 |
| Example 2 | 10 | 2 | 0.2 | 8 | 120 | 20% | 20% | 188 | 0.64 | 1884 |
| Example 3 | 10 | 4 | 0.4 | 8 | 120 | 20% | 10% | 176 | 0.71 | 1910 |
| Example 4 | 10 | 8 | 0.8 | 8 | 120 | 20% | 6% | 173 | 0.82 | 1955 |
| Example 5 | 10 | 10 | 1 | 8 | 120 | 20% | 1.8% | 169 | 0.92 | 2000 |
| Example 6 | 10 | 4 | 0.4 | 3 | 120 | 20% | 11.0% | 158 | 0.64 | 1719 |
| Example 7 | 10 | 4 | 0.4 | 5 | 120 | 20% | 7.9% | 169 | 0.76 | 1776 |
| Example 8 | 10 | 4 | 0.4 | 10 | 120 | 20% | 4.80% | 180 | 0.89 | 1832 |
| Example 9 | 10 | 4 | 0.4 | 12 | 120 | 20% | 5.3% | 176 | 0.86 | 1740 |

TABLE 1-continued

Detailed parameters and test results of Examples and Comparative Examples

| | PE base film Thickness (μm) | Functional coating Thickness (μm) | Thickness ratio of the functional coating to the base film | Polyimide nanosheet | | Mass percentage of the binder in the functional coating | Hot box shrinkage rate | Gas permeability | Puncture resistance strength | Cycle performance |
| --- | --- | --- | --- | --- | --- | --- | --- | --- | --- | --- |
| | | | | Average monolithic area (μm²) | Thickness (nm) | | | | | |
| Example 10 | 10 | 4 | 0.4 | 2 | 120 | 20% | 11.6% | 154 | 0.620 | 1667 |
| Example 11 | 10 | 4 | 0.4 | 15 | 120 | 20% | 6.9% | 173 | 0.837 | 1653 |
| Example 12 | 10 | 4 | 0.4 | 8 | 100 | 20% | 10.8% | 162 | 0.65 | 1757 |
| Example 13 | 10 | 4 | 0.4 | 8 | 180 | 20% | 9.4% | 187 | 0.75 | 1776 |
| Example 14 | 10 | 4 | 0.4 | 8 | 220 | 20% | 8.0% | 211 | 0.85 | 1795 |
| Example 15 | 10 | 4 | 0.4 | 8 | 300 | 20% | 9.2% | 184 | 0.89 | 1616 |
| Example 16 | 10 | 4 | 0.4 | 8 | 80 | 20% | 11.3% | 157 | 0.63 | 1704 |
| Example 17 | 10 | 4 | 0.4 | 8 | 320 | 20% | 9.7% | 178 | 0.94 | 1584 |
| Example 18 | 10 | 4 | 0.4 | 8 | 120 | 5% | 11.3% | 194 | 0.61 | 1651 |
| Example 19 | 10 | 4 | 0.4 | 8 | 120 | 15% | 10.5% | 185 | 0.67 | 1815 |
| Example 20 | 10 | 4 | 0.4 | 8 | 120 | 25% | 10.7% | 164 | 0.74 | 1776 |
| Example 21 | 10 | 4 | 0.4 | 8 | 120 | 40% | 11.6% | 151 | 0.78 | 1634 |
| Example 22 | 10 | 4 | 0.4 | 8 | 120 | 3% | 12.2% | 204 | 0.56 | 1519 |
| Example 23 | 10 | 4 | 0.4 | 8 | 120 | 45% | 12.5% | 139 | 0.80 | 1503 |
| Comparative Example 1 | 10 | \ | \ | \ | \ | | 51.9% | 285 | 0.44 | 1404 |
| Comparative Example 2 | 10 | 4 | 0.4 | Polyimide polymer | 120 | 20% | 16.9% | 143 | 0.53 | 1433 |
| Comparative Example 3 | 10 | 4 | 0.4 | Polyimide nanofiber | 120 | 20% | 13.0% | 158 | 0.59 | 1455 |
| Comparative Example 4 | 10 | 0.5 | 0.05 | 8 | 120 | 20% | 39.9% | 266 | 0.47 | 1470 |
| Comparative Example 5 | 10 | 0.6 | 0.06 | 8 | 120 | 20% | 36.3% | 242 | 0.50 | 1500 |
| Comparative Example 6 | 10 | 0.8 | 0.08 | 8 | 120 | 20% | 33.0% | 220 | 0.54 | 1550 |
| Comparative Example 7 | 10 | 12 | 1.2 | 8 | 120 | 20% | 1.7% | 161 | 0.97 | 1620 |
| Comparative Example 8 | 10 | 15 | 1.5 | 8 | 120 | 20% | 1.6% | 153 | 1.01 | 1600 |

From the data in Table 1, it can be seen that the separators provided in Examples 1 to 23 were additionally provided with a functional coating including polyimide nanosheets on the surface, and the thickness ratio of the functional coating to the base film was within the range of 0.1 to 1.0. The separators provided by Comparative Examples 1 to 3 were respectively provided without a functional coating, or provided with a polyimide polymer material or polyimide nanofiber on the surfaces. The separators provided by Comparative Examples 1 to 3 were significantly inferior to those of Examples 1 to 23 in terms of their properties and the battery cycle performance. At the same time, although the separators in Comparative Examples 4 to 8 were additionally provided with a functional coating including a polyimide nanosheet, the thickness ratio of the functional coating including the polyimide nanosheets to the base film was not within the range of 0.1 to 1.0, and the performance of the separators provided by Comparative Examples 4 to 8 and the battery cycle performance were significantly reduced. As can be seen, when the thickness ratio of the functional coating to the porous base film was within the range of 0.1 to 1.0, under the comprehensive influence of the thermal shrinkage and the gas permeability of the separator, the thermal stability and safety of the battery cell, and other properties, the separator and the electric apparatus may obtain the best performance.

In addition, from the data in Examples 3 and 6 to 11, it can be seen that when the average monolithic area of the polyimide nanosheet was within the range of 3 μm² to 12 μm², under the influence of multiple comprehensive properties of the separator, the battery cycle performance was better. It can be seen from the data of Examples 3 and 12 to 17, that the thickness of the polyimide nanosheet was within the range of 100 nm to 300 nm, and the battery cycle performance was better under the influence of multiple comprehensive properties of the separator. From the data of Examples 3 and 18 to 23, it can be seen that when the mass percentage of the binder in the functional coating was within the range of 5% to 40%, the battery cycle performance was better under the influence of multiple comprehensive properties of the separator.

Embodiment 1. A separator, comprising a porous base film and a functional coating disposed on at least one surface of the porous base film, wherein, the functional coating comprises polyimide nanosheets, and the polyimide nanosheets are stacked irregularly to form a lamellar loose structure; and a thickness ratio of the functional coating to the porous base film is from 0.1 to 1.0.

Embodiment 2. The separator according to Embodiment 1, wherein the porous base film has a thickness of 2 μm to 16 μm, and the functional coating has a thickness of 1 μm to 10 μm.

Embodiment 3. The separator according to Embodiment 1 or 2, wherein the polyimide nanosheets have an average monolithic area of 3 μm² to 12 μm².

Embodiment 4. The separator according to any one of Embodiments 1 to 3, wherein the polyimide nanosheets have a length of 5 μm to 10 μm and a width of 1 μm to 5 μm.

Embodiment 5. The separator according to any one of Embodiments 1 to 4, wherein the polyimide nanosheets have a thickness of 100 nm to 300 nm.

Embodiment 6. The separator according to any one of Embodiments 1 to 5, wherein the functional coating further comprises a binder; and the binder comprises one or more of polyfluoroolefin binders, polyacrylate binders, polyacrylic acid binders, polyurethane binders, silicone binders, epoxy binders and cellulose-derived binders.

Embodiment 7. The separator according to Embodiment 6, wherein a mass percentage of the binder in the functional coating is from 5% to 40%; and a mass percentage of the polyimide nanosheets in the functional coating is from 60% to 95%.

Embodiment 8. The separator according to any one of Embodiments 1 to 7, wherein the porous base film is selected from polyolefin base films, and preferably from one of polypropylene film, polyethylene film and polyethylene-propylene copolymer film.

Embodiment 9. A process for the preparation of the separator according to any one of Embodiments 1 to 8, comprising:
(1) mixing polyimide nanosheets and a binder with deionized water to obtain an aqueous dispersion of polyimide nanosheets; and
(2) applying the aqueous dispersion of polyimide nanosheets to at least one surface of a porous base film to form a functional coating, in which a thickness ratio of the functional coating to the porous base film is from 0.1 to 1.0, and drying it to obtain the separator.

Embodiment 10. A lithium ion secondary battery, comprising a positive electrode plate, a negative electrode plate, a separator disposed between the positive electrode plate and the negative electrode plate, and an electrolyte, wherein the separator is the separator according to any one of Embodiments 1 to 8.

Embodiment 11. A battery module, comprising the lithium ion secondary battery according to Embodiment 10, wherein the lithium ion secondary battery comprises a positive electrode plate, a negative electrode plate, a separator disposed between the positive electrode plate and the negative electrode plate, and an electrolyte.

Embodiment 12. A battery pack, comprising the battery module according to Embodiment 11.

Embodiment 13. An apparatus, comprising the lithium ion secondary battery according to Embodiment 10.

Although the present application has been described with reference to preferred embodiments, various modifications may be made to it without departing from the scope of the present application, and the components therein may be replaced with equivalents. In particular, as long as there is no structural conflict, the various technical features mentioned in the various embodiments may be combined in any manner. The present application is not limited to the specific embodiments disclosed in the text, but includes all technical solutions falling within the scope of the claims.

What is claimed is:

1. A separator, comprising a porous base film and a functional coating disposed on at least one surface of the porous base film, wherein,
the functional coating comprises polyimide nanosheets, and the polyimide nanosheets are stacked irregularly to form a lamellar loose structure; and a thickness ratio of the functional coating to the porous base film is from 0.1 to 1.0,
the functional coating further comprises a binder; and the binder comprises one or more of polyfluoroolefin binders, polyacrylate binders, polyacrylic acid binders, polyurethane binders, silicone binders, epoxy binders and cellulose-derived binders, and
a mass percentage of the binder in the functional coating is from 5% to 40%; and a mass percentage of the polyimide nanosheets in the functional coating is from 60% to 95%.

2. The separator according to claim 1, wherein the porous base film has a thickness of 2 µm to 16 µm, and the functional coating has a thickness of 1 µm to 10 µm.

3. The separator according to claim 1, wherein the polyimide nanosheets have an average monolithic area of 3 µm$^2$ to 12 µm$^2$.

4. The separator according to claim 3, wherein the polyimide nanosheets have a length of 5 µm to 10 µm and a width of 1 µm to 5 µm.

5. The separator according to claim 1, wherein the polyimide nanosheets have a thickness of 100 nm to 300 nm.

6. The separator according to claim 1, wherein the porous base film is selected from polyolefin base films.

7. The separator according to claim 1, wherein the porous base film is selected from one of polypropylene film, polyethylene film and polyethylene-propylene copolymer film.

8. A lithium ion secondary battery, comprising a positive electrode plate, a negative electrode plate, a separator disposed between the positive electrode plate and the negative electrode plate, and an electrolyte, wherein the separator is the separator according to claim 1.

9. A battery module, comprising the lithium ion secondary battery according to claim 8.

10. A battery pack, comprising the battery module according to claim 9.

11. An apparatus, comprising the lithium ion secondary battery according to claim 8.

12. A process for the preparation of the separator according to claim 1, comprising:
(1) mixing polyimide nanosheets and a binder with deionized water to obtain an aqueous dispersion of polyimide nanosheets; and
(2) applying the aqueous dispersion of polyimide nanosheets to at least one surface of a porous base film to form a functional coating, in which a thickness ratio of the functional coating to the porous base film is from 0.1 to 1.0, and drying it to obtain the separator,
the functional coating further comprises a binder; and the binder comprises one or more of polyfluoroolefin binders, polyacrylate binders, polyacrylic acid binders, polyurethane binders, silicone binders, epoxy binders and cellulose-derived binders, and
a mass percentage of the binder in the functional coating is from 5% to 40%; and a mass percentage of the polyimide nanosheets in the functional coating is from 60% to 95%.

* * * * *